April 28, 1959     F. A. BYNUM     2,883,874

HEAVY DUTY PUMP

Filed Feb. 3, 1958     3 Sheets-Sheet 1

INVENTOR.
FRANK A. BYNUM,
BY Earl L. Barr
ATTORNEY.

April 28, 1959  F. A. BYNUM  2,883,874
HEAVY DUTY PUMP

Filed Feb. 3, 1958  3 Sheets-Sheet 2

Thrust Bearing
Housing

INVENTOR.
FRANK A. BYNUM,
BY
Earl L. Barr
ATTORNEY.

April 28, 1959
F. A. BYNUM
2,883,874
HEAVY DUTY PUMP
Filed Feb. 3, 1958
3 Sheets-Sheet 3
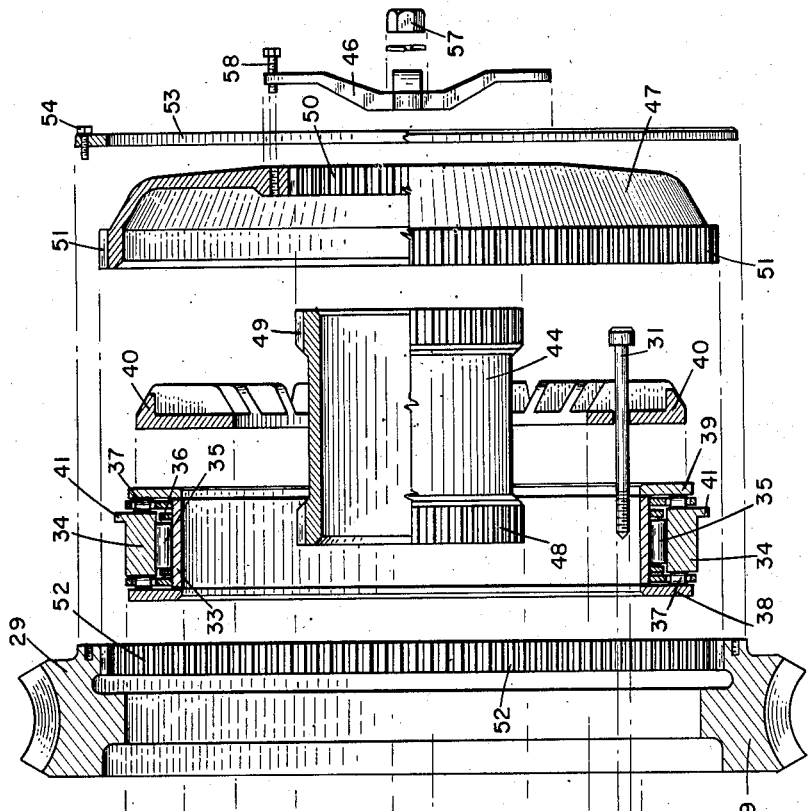
FIG. 4.
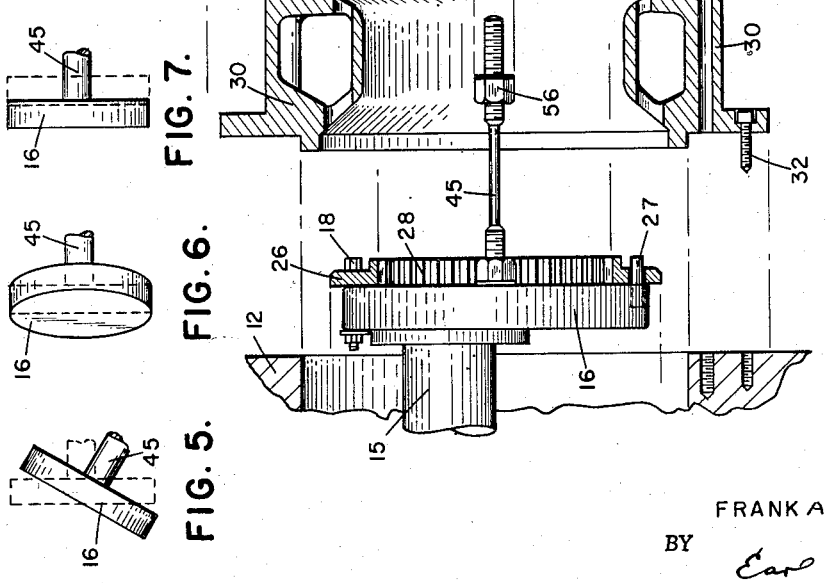
FIG. 7.
FIG. 6.
FIG. 5.
INVENTOR.
FRANK A. BYNUM,
BY
*Earl L. Barr*
ATTORNEY.

United States Patent Office 2,883,874
Patented Apr. 28, 1959

2,883,874

HEAVY DUTY PUMP

Frank A. Bynum, Duncan, Okla., assignor to Halliburton Oil Well Cementing Company, Duncan, Okla.

Application February 3, 1958, Serial No. 712,780

8 Claims. (Cl. 74—411)

This invention relates to pumps and more particularly to heavy duty pumps such as are required for pumping cement slurry and other liquids into oil wells or the like.

As oil wells are drilled deeper and deeper, pumps which force cement slurry into them have to operate at higher and higher pressures. Also, in recent years, it has become common practice to fracture earth formations in wells by pumping oil or other fluids into them at high velocities and under pressures of thousands of pounds per square inch.

It is the primary object of the present invention to provide a power driven pump which is extremely rugged and durable under such exacting conditions, although certain features of the invention are capable of more generic application.

In the following specification, the preferred embodiment of the invention will be described as applied to a heavy duty, triplex piston pump with a worm and ring gear drive connected to one end of its crankshaft.

In such a pump, one outboard journal of the crankshaft has to transmit all the torque from the driving gears to the cranks, and since the load on the pistons is variable, this journal is subjected to most peculiar bending movements which, no matter how carefully its bearing is constructed, cause it to wobble and move axially.

Experience has shown that in conventional heavy duty piston pumps, it is impossible to keep the driving gears in proper alignment if one of them is directly connected to an outboard journal. Of course, if the gears become misaligned, under heavy load, the wear on them is excessive, and they are subject to breakage.

In accordance with the present invention, a bearing and power transmitting arrangement is provided for an outboard journal and for the ring and worm gear drive associated with it which establishes, to a very high degree, a fixed relationship of relative location between the gears even though the journal wobbles or moves axially. The primary advantages of this arrangement result from longer life of the gears and more efficient operation of the pump.

Other objects and advantages of the invention will become apparent from a consideration of the following detailed description, taken in connection with the accompanying drawings, in which:

In the drawings:

Figure 4 is an exploded view in elevation illustrating the relationship of the component parts of the bearing and power transmitting assembly used in the pump of Figures 1, 2 and 3.

Figures 5, 6 and 7 are diagrammatic views of the journal shown in Figure 4, illustrating, greatly exaggerated, the components of the wobble or movement of the journal under certain theoretical load conditions in the pump.

Figure 1:
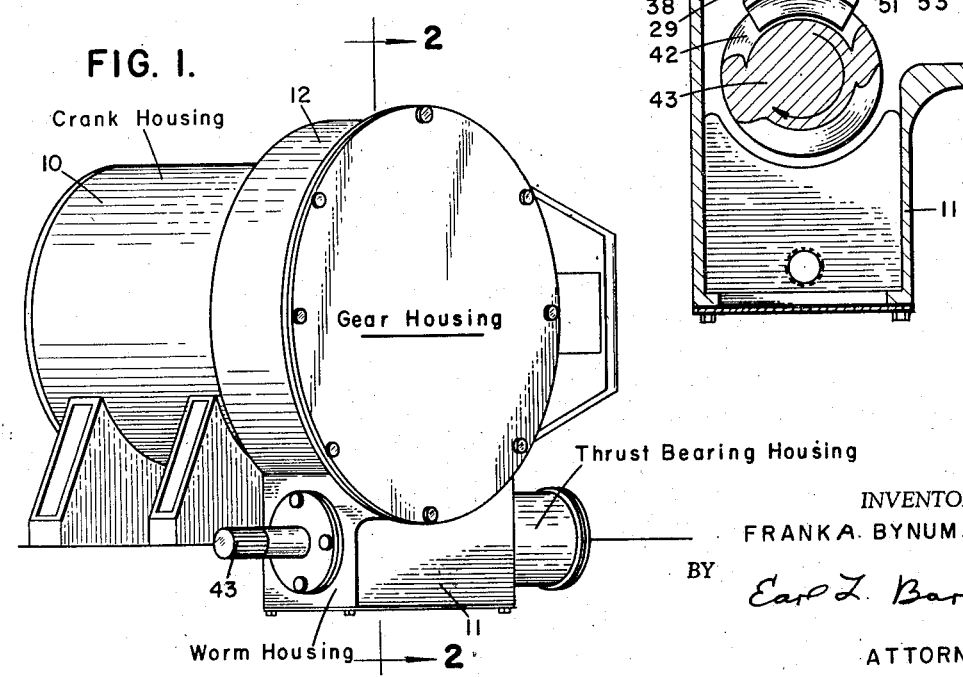
Figure 1 is an isometric view of a heavy duty pump in which the invention is incorporated.

Referring to the drawing in detail, and first to Figure 1, it will be seen that a suitable housing 10 is illustrated for the mounting of the component parts of a triplex heavy duty piston pump with the cylinders horizontal. At one end of the housing 10, there is a worm gear housing 11 and an enlarged section as shown at 12. In the main portion of the housing 10, the crankshaft and connecting rods of the pump are mounted. In the enlarged section 12 a ring gear and power transmitting assembly are mounted. The bottom portions of the housing 10 and the enlarged section 12 and the housing 11 serve as reservoirs for a lubricating oil for the moving parts.

Figure 2:
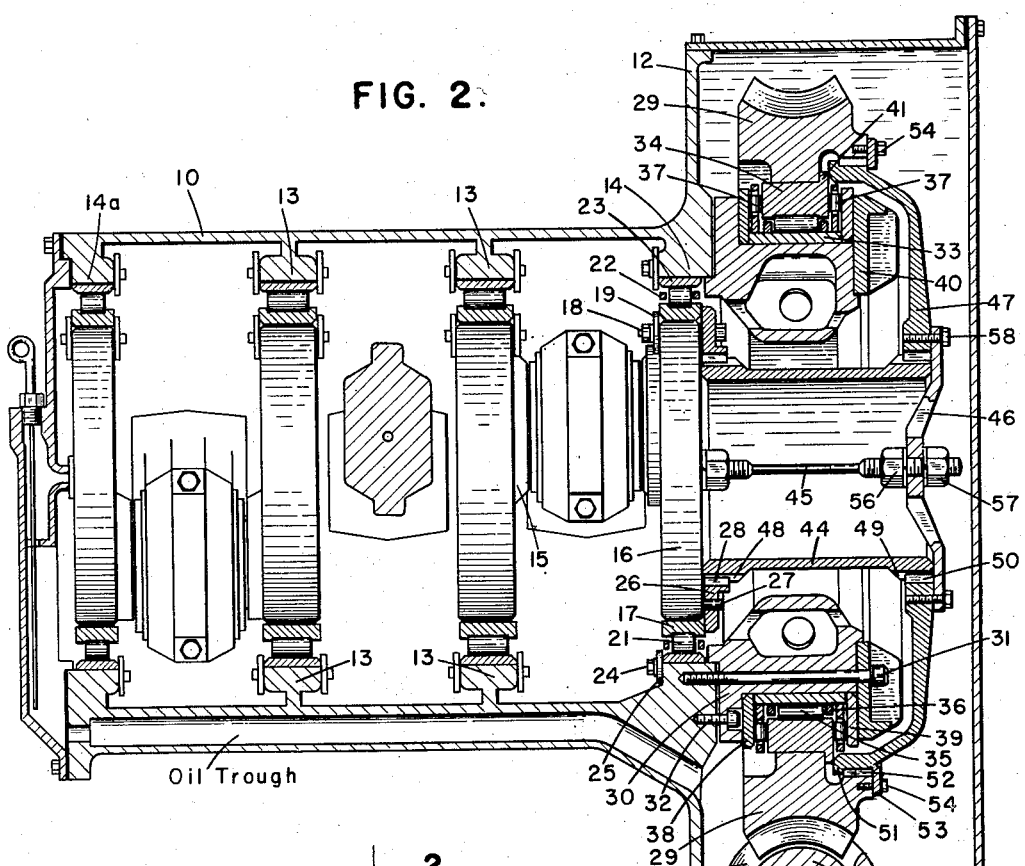
Figure 2 is a cross-sectional view of the pump of Figure 1, the view being taken along the line 2—2 of Figure 1.

Referring to Figure 2, it will be seen that two inboard main roller bearings 13 and two outboard main roller bearings 14 and 14a are provided in the housing 10 to mount the journals of the driven crankshaft 15 of a triplex piston pump. It will be understood that this crankshaft 15 is connected by suitable connecting rods to the three pistons of the pump, but since the fluid end of the pump forms no part of the present invention, the pistons are not shown in the drawing.

The important element of the crankshaft, insofar as the present invention is concerned, is the right-hand journal 16 (as viewed in Figure 2), since it is through this journal that all the torque is transmitted from the power assembly in the housing 12 to the cranks.

This journal 16 is adapted to rotate in the right-hand outboard bearing 14, and, under no load conditions, occupies a position such as illustrated; i.e., properly aligned with the bearing 14. However, the bearing 14 is so constructed as to accommodate for a certain amount of misalignment of the journal 16 with respect to the bearing 14 when the load of the pump on the driven shaft 15 causes flexure of the shaft 15. The bearing 14 has an inner race 17 clamped to the journal 16 by bolts 18 and washers 19. This race 17 has a groove in its periphery in which rollers 21 are placed, these being retained in position by a cage 22. Each roller 21 is slightly crowned.

The outer race 23 of the bearing 14 is clamped to the housing 10 by bolts 24 and washers 25. Its inner surface is cylindrical in shape.

The arrangement of bearing 14 is such that the whole journal 16 may slide axially slightly in it, or the journal may tilt or wobble in it a slight amount without damaging the bearing or causing an undue amount of friction, even when under heavy load.

Figures 5, 6 and 7 illustrate, in an exaggerated manner, the position which the journal may take under certain conditions.

Due to the fact that the loads on the cranks during the power strokes of the pistons have a vertical component, the crankshaft may be curved upwardly near the journal 16, causing it to camber. This is illustrated in Figure 5.

All during the power stroke of the pistons, the crankshaft is subjected to a heavy bending moment in a direction away from the pistons. This causes the journal 16 to have a toe-in, as illustrated in Figure 6.

Of course, if the cylinders of the pump were vertical, instead of horizontal, the camber and toe-in would be displaced 90 degrees.

When any bending of the crankshaft occurs, the journal may move axially in its bearing. This is illustrated in Figure 7.

The actual misalignment of the journal at any one time may be a combination of all of the above, and especially in a multiple piston pump becomes very complex as the loads on the pistons come on and go off.

The bolts 18, in addition to functioning as noted above, also clamp a driving ring 26 to the journal 16, as shown in Figure 2 and Figure 4, although the bolts 18 are not relied upon to transmit torque from the ring 26 to the journal. Torque is transmitted by a number of tightly pressed dowel pins 27, one of which is shown in Figure 4.

The inner surface of the ring 26 is provided with splines 28, which serve to rotate the ring 26 and hence the journal 16 and crankshaft 15.

Figure 3:
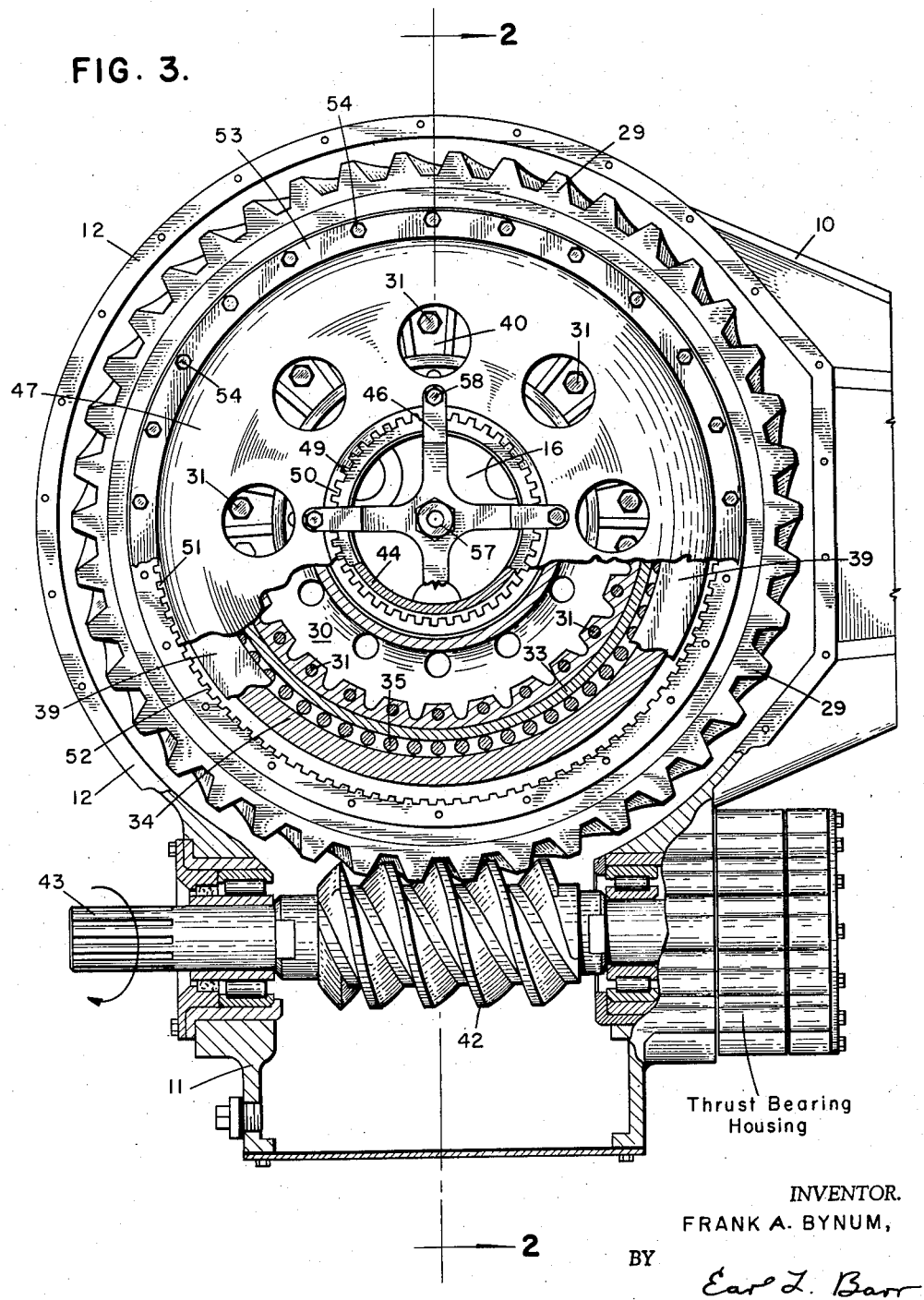
Figure 3 is a side view of the power end of the pump with portions cut away to show the construction.

As shown in Figures 2 and 3, there is a large diameter ring gear 29 located in the enlarged housing 12. This gear is preferably made of bronze.

To support the bearing for the ring gear 29, a large arbor 30 is secured to the housing 10 by the cap screws 31 and 32.

The bearing for the ring gear 29 is adapted to resist both radial load and lateral thrust so as to hold the same in proper position at all times. It includes an inner race 33 tightly fitted on the arbor 30, and an outer race ring 34 shrunk fit into the ring gear 29. Located between these races are the rollers 35 retained by their cage 36. The races 33 and 34 and the rollers 35 hold the ring gear 29 against radial or vertical movement.

In addition to the rollers 35, it will be seen that thrust rollers 37 are located adjacent the side walls of the outer race ring 34. These thrust rollers are also provided with suitable cages.

The thrust rollers 37 transmit lateral forces in either direction from the outer race ring 34 to the arbor 30 through the thrust race rings 38 and 39, these being secured to the arbor 30 by the retaining ring 40 and the cap screws 31.

It will be seen that the outer race ring 34 is provided with a flange 41 which engages one side of the ring gear 29. This flange insures against lateral movement of the gear 29 on the ring 34 in one direction (to the right, as viewed in Figures 2 and 4). The ring 34 may be mounted in the gear 29 with the flange on the opposite side, the selection depending upon what direction the gear 29 is to be rotated when the pump is in use.

As shown in Figures 2 and 3, the ring gear 29 is rotated by a worm 42 on a drive shaft 43 mounted in conventional support and thrust bearings in the housing 11.

In the arrangement illustrated, the worm 42 is intended to be rotated in a clockwise direction, as viewed in Figure 2, so that the ring gear 29 rotates clockwise as viewed in Figure 3. The teeth of the gears are such that the forces set up tend to cause the ring gear to separate from the worm and also to create a side thrust on the bottom of the gear to move it to the right, as viewed in Figure 2.

The tendency of the gears to separate is resisted by the rollers 35.

The forces tending to thrust the ring gear 29 to the right, as viewed in Figure 2, are transmitted through the lower portion of the race ring 34 and the lower portion of its flange 41 to the right-hand thrust rollers 37, the lower portion of the race 39, the arbor 30, the retaining ring 40 and the cap screws 31 to the housing 10.

It will be observed that this side thrust cannot cause material misalignment of the ring gear with respect to the worm, because the bearing structure which resists lateral movement; i.e., the lower portion of the race ring 34, the lower portion of the race 39 and the cap screws 31 which hold that portion of the arbor 30 are all very close to the point of application of the side thrust; to wit, the point where the teeth of the ring gear 29 are in mesh with the worm.

Were it not for the close proximity of the structure which resists lateral movement of the ring gear 29 to the point of application of the lateral thrust, the ring gear would bend and its teeth become misaligned. Even slight misalignment creates very destructive forces on the teeth and greatly reduces the efficiency of the gear train.

As described above, then, the structure of the pump is such that the journal 16 is subject to wobble motion while the ring gear 29, which is to drive it, is firmly held against wobble motion. The coupling assembly for the ring gear 29 to the journal 16 must accommodate this relative movement while the two rotate together. This will now be described.

The coupling assembly for the gear 29 and the journal 16 includes a floating torque tube 44, and a stud bolt 45, with its spider 46 and flange 47.

As best shown in Figure 4, the torque tube 44 is provided with splines 48 and 49 at both ends. These are slightly crowned. As shown in Figure 2, the splines 48 mesh, with some slight amount of play or clearance, with the splines 28 of the driving ring 26 secured to the journal 16.

The splines 49, on the other hand, mesh, with some slight amount of clearance, with the splines 50 provided on the inner cylindrical surface of the flange 47.

The flange 47 is rigidly and firmly connected to the ring gear 29. Its outer rim is provided with dovetails 51 which interlock, as in a mortise and tenon joint, with similar dovetails 52 on the inner surface of a flange on the gear 29. The coupling 51—52 should not be confused with the splines 49—50 and 28—48. There is no play between the parts at the coupling 51—52, while there is limited play at the couplings at the ends of the torque tube 44.

The flange 47 is held in place on the ring gear 29 by the clamping ring 53 and cap screws 54.

The purpose of the stud 45 and the spider 46 is merely to hold the above described parts of the coupling assembly together. The stud shaft 45 is of small diameter so as to be flexible. It has its left-hand end (Figures 2 and 4) screwed into the journal 16 and held by a lock nut, while its right-hand end is secured by nuts 56 and 57 to the center of the spider 46.

The spider 46 is, in turn, secured to the flange 47 by the cap screws 58.

While the stud 45 holds the parts together, it does not transmit any torque. Moreover, because of the extremely large forces exerted on the other parts of the power transmission assembly, it offers practically no resistance to movement either as to bending or stretching. Accordingly, the torque tube 44 may be said to be fully floating. That is, the torque tube, not being mounted in any bearings, is free to move axially; it is free to tilt or wobble; and its ends can be distorted into an elliptical shape, so that all of its splines 48 can remain in mesh with the splines 28, and all of its splines 49 remain in mesh with the splines 50 even though its axis is out of alignment with both the axis of the journal 16 and the axis of the ring gear 29.

The operation of the pump described above is as follows:

When rotational power from some external source (not shown) is applied to the drive shaft 43 of the worm 42, the ring gear 29 is rotated and torque is transmitted from the ring gear 29 to the torque tube 44 through the flange 47 and the splines 49—50. The torque is transmitted to the ring 26 and the journal 16 through the splines 48—28.

Due to the play in the splines and due to the fact that the teeth of splines 48 and 49 are slightly crowned, the torque tube 44 can float and distort into such shape and position as to accommodate for some misalignment, and still not overload the teeth of the splines.

Due to the fact that the load on each piston of the pump is extremely variable, going from maximum on the power stroke to zero on the return stroke, and due to the fact that the angle between the crank and the connecting rod of each cylinder of the pump changes all during the power stroke, a very complex wobble is created in the journal 16, but none of this wobble affects the position of the ring gear 29.

The flexure and movement of the torque tube 44 permits the teeth of the ring gear 29 to remain in proper position with respect to the worm 42.

On the other hand, the lifting force and the side thrust, exerted upon the ring gear 29 by the nature of the worm drive itself, are taken care of by the bearings which mount the ring gear, so that an arrangement has been provided in which the power end of the pump has long life and high efficiency.

It will be apparent to those skilled in the art that although the invention has been described as specifically applied to a heavy duty, worm driven, oil field, multiple cylinder, piston pump, certain features are applicable to other power transmission systems, such as engines. It is obvious, for example, that a bevel driving gear creates both a lifting force and a side thrust on a bevel driven gear, and the principles of the present invention may readily be adapted to the use of such gears instead of the worm and ring gear illustrated and described.

The invention is, of course, of most pronounced advantage when applied to a machine in which the load varies over wide limits, as where a driven shaft, like the crankshaft 15 illustrated, is subjected to marked changes in bending moments. Some of the features of the invention would be applicable, however, to a machine in which the load was fairly constant and the driven shaft not subjected to the extreme forces which create the wobble in the journals of oil field pumps.

Accordingly, it is to be understood that various changes may be made without departing from the spirit of the invention or the scope of the annexed claims.

I claim:

1. In a heavy duty pump suitable for rapidly forcing fluid under high pressure into an oil well or the like, the combination with a drive shaft and a driven shaft subjected to large and variable bending moments by the load on the pump, of a journal on one end of the driven shaft, a bearing for the journal so designed as to accommodate for some misalignment, axial movement and wobble of the journal with respect to the bearing when the variable bending moments on the driven shaft cause variable flexure therein, a worm on the drive shaft, a ring gear adapted to be rotated by the worm, a bearing for the ring gear adapted to resist both radial load and lateral thrust and thus hold the same in properly aligned position with respect to worm, and a power transmission assembly connecting said ring gear to said journal, said power transmission assembly including couplings adapted to accommodate for the misalignment between the journal and the ring gear.

2. The combination defined in claim 1 in which the bearing for the ring gear consists of thrust rollers located in close proximity to the point where the teeth of the ring gear mesh with the worm.

3. The combination defined in claim 1 in which the power transmission assembly also includes a freely floating torque tube.

4. The combination defined in claim 1 in which the power transmission assembly also includes a freely floating torque tube and a flexible stud bolt for holding the parts of the assembly together.

5. A power transmission comprising, in combination, a drive shaft and a driven shaft, a journal on the driven shaft, a bearing for the journal so designed as to accommodate for some misalignment, axial movement and wobble of the journal with respect to the bearing, a driving gear on the drive shaft, a driven gear for the driven shaft in mesh with said driving gear, a bearing for the driven gear adapted to resist both radial load and lateral thrust and thus hold the driven gear in properly aligned position with respect to the driving gear and a torque transmission assembly connecting said driven gear to said journal, said torque transmission assembly including a freely floating torque tube and couplings adapted to accommodate for misalignment between the journal and the driven gear.

6. The combination defined in claim 5 in which the torque transmission assembly also includes a flexible stud bolt for holding the parts of the assembly together.

7. A power transmission comprising, in combination, a housing having an arbor, a crankshaft mounted in said housing, a ring gear mounted for rotation upon said arbor, a worm gear mounted for rotation in said housing and engaging said ring gear, means to absorb lateral thrust of said worm gear, means to absorb axial and radial thrust of said ring gear, a splined ring attached to said crankshaft, a splined torque tube slidably engaging said splined ring, a splined flange adapted to connect said torque tube to said ring gear, and a thrust retainer spider for said torque tube, the arrangement being such that deflections of said crankshaft are absorbed by said torque tube and not transmitted to said ring gear.

8. A power transmission comprising, in combination, a frame, a drive shaft mounted on the frame and having a driving gear thereon, a driven shaft mounted on the frame in a bearing which will permit some misalignment, axial movement and wobble of the driven shaft with respect to the frame, a driven gear in mesh with the driving gear, the driven gear and the driving gear being of such a nature that, during operation, the driving gear subjects the driven gear to radial load and to lateral thrust, a bearing for the driven gear adapted to resist both radial load and lateral thrust on the driven gear and hold the driven gear on the frame in properly aligned position with respect to the driving gear, and a torque transmission assembly connecting said driven gear to said driven shaft, said assembly having means for accommodating for misalignment between said driven shaft and said driven gear.

References Cited in the file of this patent

UNITED STATES PATENTS

| | | |
|---|---|---|
| 1,634,499 | Holdsworth | July 5, 1927 |
| 1,759,338 | Allen | May 20, 1930 |
| 2,055,014 | Manger | Sept. 22, 1936 |
| 2,310,329 | Tyler | Feb. 9, 1943 |